United States Patent [19]

Rosenthal et al.

[11] Patent Number: 4,514,470
[45] Date of Patent: Apr. 30, 1985

[54] DIFFUSION BONDING BETWEEN TITANIUM BASE ALLOYS AND STEELS

[75] Inventors: Dan G. Rosenthal, Huntington; Louis J. Fiedler, Trumbull, both of Conn.

[73] Assignee: Avco Corporation, Stratford, Conn.

[21] Appl. No.: 443,469

[22] Filed: Nov. 22, 1982

[51] Int. Cl.³ .............................................. B32B 15/01
[52] U.S. Cl. .................................... 428/662; 428/675; 428/679; 428/680; 428/681; 428/684; 428/685; 228/263.15; 228/263.21
[58] Field of Search ...................... 228/263.15, 263.21, 228/56 R; 428/660, 661, 662, 674, 675, 679–681, 684, 685

[56] References Cited

U.S. PATENT DOCUMENTS 3,604,103  9/1971  Bonchak et al. ................... 428/660
3,615,902 10/1971  Lesney ................................ 428/660
4,305,998 12/1981  Manty et al. ....................... 428/661

Primary Examiner—L. Dewayne Rutledge
Assistant Examiner—Robert L. McDowell
Attorney, Agent, or Firm—Ralph D. Gelling

[57] ABSTRACT

Disclosed is a novel three-layered metallic interlayer material which provides good diffusion bonding between titanium alloys and steel or between titanium alloys and nickel alloys. The interlayer is comprised of three separate layers of metals as follows: a nickel layer which is placed in contact with the steel or nickel alloys, a Group V-B metal layer which is placed in contact with the titanium alloy and a copper layer which is sandwiched between the nickel and the Group V-B metal layers.

7 Claims, No Drawings

DIFFUSION BONDING BETWEEN TITANIUM BASE ALLOYS AND STEELS

BACKGROUND OF THE INVENTION

This invention relates, in general, to diffusion bonding and, more specifically, to compositions for bonding titanium alloys to either steel or to nickel alloys, such as nickel superalloys. In particular, the present invention relates to a three-layered metallic interlayer material comprised of a first layer comprising nickel, overcoated with a second layer comprising copper, further overcoated with a third layer comprising a Group V-B metal. The nickel layer is placed in contact with the steel or nickel alloy while the Group V-B metal layer is placed in contact with the titanium alloy.

In the gas turbine industry, hybrid metal and composite shafts have been constructed to withstand the torsional and bending stresses placed on a small diameter drive shaft for a turbine engine. Shafts, for example, comprising a thin-wall metal (e.g. steel) tube with integral splines on both ends and a filament (such as boron filament) reinforced metal matrix composite cylinder (e.g. titanium matrix) metallurgically bonded to the metal tube inner diameter have been produced. The fibers in the metal matrix composite run parallel to the axis of the shaft. The composite sleeve is fabricated and bonded to the inner diameter of the metal tube by winding the composite monolayer tape on a mandrel with the filaments axially aligned. The mandrel is then inserted into a metal outer tube. The assembly is encapsulated, evacuated, sealed and pressurized at a sufficient temperature to achieve consolidation and diffusion bonding of the wound composite to itself and the shaft inner diameter. This process results in a fully consolidated hybrid shaft having a metal outer shell and a metal matrix composite inner sleeve reinforced by filaments, such as those made of boron, to enhance bending stiffness.

While it is highly desireable to specifically use titanium matrix composites and steel or nickel alloys, titanium does not form high-strength metallurgical bonds with steel or nickel alloys. This is due to the formation of brittle iron-titanium or nickel-titanium intermetallic compounds and titanium carbide. These brittle constituents form at the interface of the two alloys and provide an easy fracture path.

It is, therefore, an object of this invention to provide high-strength metallurgical bonds between either iron or nickel alloys and titanium alloys.

It is another object of the present invention to provide metallurgical bonds between either iron or nickel alloys and titanium alloys without the formation of brittle iron-titanium or nickel-titanium intermetallic compounds and titanium carbide.

It is still another object of this invention to provide an interface material which provides progressive compatibility between iron or nickel and titanium alloys.

It is still a further object of this invention to provide improved combined metal and composite shafts used in a gas turbine engine.

It is yet another object of this invention to produce a composite shaft for a gas turbine engine having a steel outer sheath and an interior shell constructed of a titanium matrix composite containing axially aligned filaments of a high modulus material, said interior shell being completely consolidated and bonded on the inner diameter of the outer steel or nickel alloy sheath.

It is still another further object of the present invention to provide a composite shaft wherein there is progressive compatibility between an outer steel or nickel alloy sheath and a titanium matrix composite containing axially aligned filaments, diffusion bonded thereto.

SUMMARY OF THE INVENTION

The foregoing objects, and others, are accomplished in accordance with this invention, generally speaking, by providing a novel three-layered metallic interlayer material which provides good diffusion bonding between iron or nickel and titanium alloys. This interlayer material comprises a nickel layer which is placed in contact with the iron or nickel alloy, a Group V-B metal layer which is placed in contact with the titanium alloy and a copper layer sandwiched between the nickel and Group V-B metal layers.

DETAILED DESCRIPTION OF THE INVENTION

According to the present invention, interface materials which provide progressive compatibility between iron or nickel and titanium must be used. Refractory metals in Group V-B of the periodic table provide such compatibility with titanium. Of the Group V-B metals, niobium, tantalum and vanadium are particularly compatible with titanium and, accordingly, are preferred. The reason for such compatibility is the good solid solution characteristics of these elements with titanium as demonstrated in "Hanson's Constitution of Binary Alloys" McGraw-Hill Book Company, Inc., pp 1019, 1223 and 1241; 1958. These same V-B metals, however, are not compatible with common iron-base alloys (e.g. steel) because carbon in the steel migrates to the interface to form brittle refractory carbides during the diffusion bonding cycle.

Copper is compatible with common iron-base alloys as well as with the refractory Group V-B metals, because it is insoluble in both and does not form intermetallic compounds. However, diffusion bonding using a two-layered interlayer system is not successful since there is a presence of copper oxide particles in the copper layer at the steel-copper interface. This condition exists even when oxygen free-high conductivity copper foil is used. The source of oxygen, to form the unwanted copper oxide, may be attributed to residual oxygen present in the vacuum chamber of the diffusion bonding facility. A carbon-oxygen reaction may also contribute to copper oxide formation since it is located at the copper-steel interface.

The addition of a nickel layer between the copper-steel interface resolves the problem of formation of copper oxide and allows for progressive compatibility between iron and titanium alloys. In the case of a nickel superalloy to titanium joint, the nickel layer would desireably be in the form of a nickel electroplate applied to the nickel superalloy surface. This would prevent the formation of undesireable oxides on the surface from the constituents present in the nickel superalloy, such as aluminum or chromium.

Each of the three metal layers (Nickel, Copper, and Group V-B Metal) making up the novel three-layered metallic interlayer material of the present invention should have a thickness of about 0.0005 inches to about 0.002 inches. Preferred results are obtained when each layer is about 0.0005 inches to about 0.001 inches in thickness. The diffusion bonding may be performed at any suitable temperatures such as, for example, between 1600° F. and 1700° F. for about 1-2 hours at a pressure between about 2-3 ksi in either a vacuum or neutral atmosphere.

The present invention will be further illustrated by the following examples in which parts and percentages are by weight unless otherwise specified.

EXAMPLE I

A three-foil interface system consisting of a 0.001 inch (0.0254 mm) layer of nickel overcoated with a 0.001 inch layer of copper, further overcoated with a 0.001 inch niobium foil was used to diffusion bond a titanium alloy and steel. The diffusion bonding was performed at 1650° F. (899° C.) and 2.5 ksi (17.2 MPa) for one hour. Tensile testing was conducted at room temperature and at 700° F. (371° C.). The results, indicated in the table below, indicate excellent bonding between the titanium and steel through use of the interface.

| Test Temperature | Tensile Test Results Of Diffusion Bond Using Nb/Cu/Ni Interface | | |
|---|---|---|---|
| | Ultimate Tensile Strength (ksi) | Percent Elongation | Percent Reduction In Area |
| Room Temperature | 73.8 | 0.7 | 1.5 |
| 700° F. | 45.8 | 0.2 | 2.2 |

The ability of the three-foil system to produce plastic strain in the parent materials demonstrates that brittle intermetallic compounds have been prevented.

EXAMPLES II AND III

Example I is repeated two times using Group V-B metals tantalum and vanadium, respectively. Similar tensile strength results are obtained.

While specific components and conditions of the present system are defined in the working examples above, any of the other typical materials, temperatures, pressures, etc. may be substituted in these working examples, if appropriate.

Using the novel three-layered metallic interface material of the present invention, shafts for use in gas turbine engines, comprising an interior shell constructed of a titanium matrix containing axially aligned filaments of a high modulus material, such as boron, bonded on the inner diameter of an outer tubular steel sheath having an interior axially extending passage, may be prepared. The interface materials (i.e., Nickel, Copper and a Group V-B refractory metal) provide progressive compatibility and, hence, an excellent diffusion bond between the steel and titanium.

While various specifics are given in the present application, many modifications and ramifications will occur to those skilled in the art upon a reading of the present disclosure. These are intended to be covered herein.

What is claimed is:

1. A composite comprising (a) an inner material comprising titanium; (b) an outer material comprising iron, nickel or mixtures thereof; and (c) a three-layered metallic interlayer material which is used to diffusion bond said inner material and said outer material, said interlayer material comprising a first layer comprising nickel, said first layer in contact with said outer material, a third layer comprising a Group V-B metal, said third layer in contact with said inner material and a second layer comprising copper, said second layer sandwiched between said first layer and said third layer.

2. The composite of claim 1 wherein said Group V-B metal is selected from the group consisting of niobium, tantalum, vanadium and mixtures thereof.

3. The composite of claim 1 or 2 wherein each of said first, second and third layers are from about 0.0005 to about 0.002 inches thick.

4. The composite of claim 1 or 2 wherein each of said first, second and third layers are from about 0.0005 to about 0.001 inches thick.

5. The composite of claim 1 or 2 wherein diffusion bonding is performed at about 1600° F.-1700° F.

6. The composite of claim 1 or 2 wherein said outer material comprises steel.

7. The composite of claims 1 or 2 wherein said outer material comprises a nickel alloy.

* * * * *